United States Patent Office 3,756,970
Patented Sept. 4, 1973

3,756,970
POLYURETHANE FOAMS HAVING IMPROVED COMPRESSION SET
Peter Siegbert Bauchwitz, Wilmington, Del., assignor to E. I. du Pont de Nemours and Company, Wilmington, Del.
No Drawing. Filed May 19, 1972, Ser. No. 255,181
Int. Cl. C08g 22/44
U.S. Cl. 260—2.5 AC        14 Claims

ABSTRACT OF THE DISCLOSURE

A process for producing a flexible polyurethane foam, with low 90% compression set which comprises reacting an undistilled phosgenation product of tolylene diamine, which has an amine equivalent of about 90–125, a polymeric polyol and a cross-linking agent, in the presence of a foaming agent, a halogen source, a mineral acid, a tin-based urethane catalyst and a tertiary amine catalyst.

BACKGROUND OF THE INVENTION

It is known that polyurethane cellular products or foams can be prepared by reacting, in the presence of a blowing agent, a polyisocyanate with a polyfunctional hydroxyl compound such as a polyether polyol. Polyurethane foams are characterized as flexible or rigid depending primarily on the extent of cross-linking in the foam structure. Thus, foams derived from polyethers of relatively high average molecular weight and relatively low hydroxyl number are generally flexible while foams derived from polyethers of relatively low average molecular weight and relatively high hydroxyl number are generally rigid.

Various advantages, such as improved flex fatigue, accrue from the use of an undistilled phosgenation product, commonly referred to as crude tolylene diisocyanate (TDI), as the polyisocyanate component in whole, or in part, in the manufacture of flexible polyurethane foams, see, e.g., British Pat. No. 1,091,629. Such foams, however, tend to have poor resistance to hot compression compared with foams prepared from refined or distilled tolylene diisocyanate (TDI), particularly they have poor 90% compression set.

Several methods have been attempted to improve the compression set of flexible foams derived from crude TDI such as the introduction of polyfunctional cross-linking agents to increase the extent of cross-linking in the foam structure. This process alone, however, tends to increase the rigidity of the foams to the point where they are no longer useful in some applications requiring flexible foams. Other processes have also met with limited success.

There is a definite need in current markets such as furniture and automotive cushioning for such a flexible foam which when subjected to 90% compression will recover to substantially its original configuration; that is to say, it will be distorted no more than about 15% after being subjected to 90% compression.

The preparation of such a foam from crude TDI is, as indicated above, quite difficult and has tended to be extremely expensive even though success has been limited. Thus, there is a need for a flexible foam based on crude TDI which when subjected to a high compression, e.g. about 90%, will return to its original configuration with only a minimal distortion, wherein the cost of preparing such a foam is not prohibitive.

SUMMARY OF THE INVENTION

According to this invention there is provided an economical process for preparing a flexible polyurethane foam, with low 90% compression set, which comprises reacting an undistilled phosgenation product of tolylene diamine which has an amine equivalent of about 90–125, a polymeric polyol and a cross-linking agent, in the presence of a foaming agent, a halogen source, a mineral acid, a tin-based urethane catalyst, and a tertiary amine catalyst.

DETAILED DESCRIPTION

In more detail, this invention pertains to the reaction of the various elements described above to form a flexible polyurethane foam having low 90% compression set. A detailed description of the elements and the reaction follows:

The crude tolylene diisocyanate (TDI) is obtained by phosgenating tolylene diamine and removing the phosgenation solvent. The crude products contain the diisocyanate corresponding to the tolylene diamine and "phosgenation by-products." Phosgenation by-products are complex, tarry, nonvolatile, hexane-insoluble materials produced by the reaction of phosgene and the primary diamine. They are generally considered by those skilled in the art to be predominantly carbodiimides, polycarbodiimides, biurets, and polybiurets, all bearing free isocyanato groups. Phosgenation by-products are the residues remaining after the corresponding diisocyanates and the phosgenation solvent have been removed from the phosgenation product of a primary diamine. For example, in the case of tolylene diamines by-products are the residues remaining after the removal of the aromatic diisocyanates and the phosgenation solvents at between about 1–5 mm. mercury and a final bottoms temperature of about 200° C. The isocyanate composition contains from about 5–50% by weight of phosgenation by-products and preferably is limited to from about 10–30% by weight of these materials.

The following representative isocyanate compositions can be used in this invention:

(1) The crude product obtained after removal of the solvent from the phosgenation product of tolylene diamine.

(2) Phosgenation by-products can be added to an isocyanate composition such as that obtained in (1) above to give a material having a high phosgenation by-product content. The final composition must not have an amine equivalent exceeding about 125.

The preferred method of obtaining the isocyanate composition is that described in (1) above because of its convenience and simplicity.

The preferred isocyanate composition which is reacted in the instant invention is crude tolylene diisocyanate (TDI) which has an amine equivalent of from about 100–120 and is obtained as a crude fraction, stripped of solvent, in the manufacture of tolylene diisocyanate by phosgenation of tolylene diamine.

The amine equivalents of the crude TDI may vary generally between about 90 and 125. It is preferred to utilize an amine equivalent of about 100 to 120. The amount of the crude TDI used in the foam recipes is based on the amount of the polymeric polyol present. A mole ratio of about 0.8–1.2 of crude TDI isocyanato groups to active hydrogens (—NH$_2$ and —OH) may be employed. Preferred is a ratio of about 1.05 to 1.0.

The polymeric polyols preferably have number average molecular weights of from about 3000 to 8000. The most preferred number average molecular weight is from about 4000 to 6000. The preferred polymeric polyols are polyalkyleneether glycols or triols or mixtures thereof. Polyether polyols of this type can be obtained by reaction of an alkylene oxide, for example, propylene oxide, trimethylene oxide or butylene oxide or mixtures thereof, with a polyhydric alcohol such as ethylene glycol, propylene glycol, dipropylene glycol, tetramethylene glycol, glycerol, trimethylolpropane or a mixture thereof. "Activated" or "balanced" polyols can also be used. Activated polyols are prepared from a mixture of alkylene oxides such as ethylene oxide and propylene oxide, and balanced polyols are prepared by separately reacting different alkylene oxides so that a block copolymer containing two or more different poly(oxyalkylene) blocks is obtained. Depending on the reactants used and the method of manufacture, polymeric polyols derived from alkylene oxides can contain only secondary hydroxyl groups or a mixture of secondary and primary hydroxyl groups. By finally reacting these polyols with controlled amounts of ethylene oxide, modified polyols having a higher content of primary hydroxy groups are obtained. These modified polyols are generally referred to as "capped" or "tipped" polyether polyols and can be used with advantage in this invention.

Alternatively the polymeric diol can be obtained by polymerizing a cyclic ether such as tetrahydrofuran.

The polymeric polyols can have hydroxyl numbers of about 15 to 60, preferably about 20 to 45. The amounts of the other components of the foam are determined by how much polymeric polyol is used, and quantities of components are described in those terms.

The mineral acid which is utilized may be any of the conventionally known mineral acids such as hydrochloric acid, nitric acid, sulfuric acid and phosphoric acid. Combinations of these acids may also be utilized.

The preferred halogen sources are relatively stable compounds, compatible with the foams, that release halogen ions under the condition of hot compression, particularly the following: ammonium chloride or bromide, tetramethyl ammonium chloride, tribromophenol, and bromopropane and chloropane derivatives. The bromopropane derivatives may be the following: 2-bromopropane, 2-bromopropanol, 1,2-dibromopropane, 2,3-dibromopropane and 2,3-dibromopropanol. Mixtures of those compounds may also be used. The chloropropane derivatives would be the same compounds with chlorine replacing bromine.

The most preferred halogen sources are the following: 2,3-dibromopropanol, ammonium chloride and bromide.

It is thought that the combination of the mineral acid and the halogen source provides halide ions which can interact with the chemical species formed during hot compression, such species would, in the absence of the halide ion, otherwise react in a different manner to produce foams with high residual set. It should be emphasized, however, that there is no intention to be bound by any theory.

A cross-linking agent is also required but in itself is not sufficient to remedy the high 90% compression set obtained with crude tolylene diisocynate foams. The cross-linking agent are nonpolymeric polyols containing 3 or more active hydrogen atoms. The nonpolymeric polyols, which can be aliphatic, alicyclic or aromatic, contain from 3 to 8 hydroxyl groups. Preferred aliphatic nonpolymeric polyols are the hexane triols, glycerol, triethanolamine, sorbitol and pentaerythritol. Alicyclic nonpolymeric polyols include sugars containing 4, 5 and 6 carbon atoms; for example, glucose, xylose and galactose. Aromatic nonpolymeric polyols include trihydric phenols, etc., phloroglucinol. Condensation products of propylene oxide and the preceding aromatic polyols can also be used as can mixtures of any of the foregoing polyols.

The nonpolymeric polyols preferably have equivalent weights of about 30–80, with equivalent weights of about 45–60 being most preferred.

The nonpolymeric polyols are employed in the preparation of the foams of this invention in amounts of about 5–15% by weight, based on the weight of the polymeric polyol.

Aromatic polyamines containing two or more active hydrogen atoms are very useful as additional cross-linking agents. Arylene polyamines may be used as the additional cross-linking agents. The term "arylene polyamine" as used herein means a compound in which each of two or more amino groups is attached to the same or to different benzene radicals or related polycyclic aromatic hydrocarbon radicals. Representative polyamines include derivatives of tolylene diamines, metaphenylene diamines and phenylene diamines, for example, 2,5-dichlorophenylene-1,4-diamine.

Especially good results are obtained by using as the cross-linking agent the crude condensation product of aniline, o-chloroaniline and formaldehyde, as disclosed in U.S. 3,56,906 to Hoeschele. Such crude condensation products are prepared by condensing aniline, o-chloroaniline and formaldehyde in the amount of about 1.65–1.9 moles of amine per mole of formaldehyde. The mole ratio of aniline to 2-chloroaniline used is about 0.1–4.0.

The amines are employed in the amounts of about 3–10% by weight based on the weight of the polymeric polyol. Preferably, when using amines or mixtures of amines containing a proportion of hindered amino groups and which are primarily composed of two linked phenyl radicals each containing an amino group, these compounds are used in the amounts of 3.5–5% by weight calculated on the weight of the polymeric polyol.

A blowing agent is employed to expand the formulation of this invention to a foam during the reaction of the crude TDI, the polymeric polyol and the cross-linking agent by techniques well known in the art. Suitable blowing agents are halogenated hydrocarbons such as trichlorofluoromethane and methylene chloride. Water may also be used as a blowing agent. The term blowing agent when applied to water is understood to refer to the $CO_2$ generated by the reaction of the water with isocyanato groups. The density of the foam can be varied by using different proportions of the blowing agent. The preferred blowing agent is water, partly because of its convenience and availability, and partly because it offers the additional advantage of producing urea linkages which serve as cross-linking sites. Water can be used in conjunction with the nonaqueous blowing agents mentioned above. In general, about 2 to 5 parts by weight of water per 100 parts of polyol are used. However, greater or lesser amounts can be employed depending upon the density of the foam desired. Such amounts can be readily calculated by one skilled in the art.

The undistilled phosgenation product of an aromatic diamine, polymeric polyol, crosslinkers and water, if water is used as the blowing agent, are reacted in such proportions that there are about 0.8 to 1.2 isocyanato groups per active hydrogen in the foam forming ingredients. Preferably there are about 1.00 to 1.05 isocyanato groups per active hydrogen.

Catalysts which are tin-based should be present during the formation of the foam. Conventional type catalysts should also be used such as the well known tertiary amines which catalyze both the water-isocyanate and polyol-isocyanate reactions; triethylenediamine which principally catalyzes the water-isocyanate reaction is used in conjunction with the usual organo-tin catalysts such as dibutyltin dilaurate and stannous octoate which principally catalyzes the isocyanate-polyol reaction. Triethylenediamine, which has been found to contribute to particularly high quality foam, is generally used in the amount of 0.5 to 2.0 parts per 100 of polymeric polyol.

Other materials which can be employed in the production of the foams of this invention at the discretion of one skilled in the art include stabilizers, pigments, fillers, flame retardants and extenders.

Stabilizers, for example, sulphonated castor oil and silicones, such as polydimethylsiloxanes can be added to improve the miscibility of the components thereby regulating cell size. However, care should be taken when using silicones of the polyoxyalkyleneether-polydimethylsiloxane block copolymer type to avoid the production of closed cell foams or collapsed foams. In manufacturing molded foams, it may be advantageous to include a relatively minor amount of a polydimethylsiloxane surfactant to modify the surface cell structure of the product or a silicone of the above-described block copolymer type. However, the silicones of the block copolymer type should not be used in amounts more than 0.1% by weight of the foam formulation. If flame retardant foams are desired, it is generally advisable to omit silicones of the block copolymer type or to use such material only in very minor amounts. Optimum amounts of the various additives to be used for the particular effect desired can readily be determined by one skilled in the art.

The foams of this invention can be made by prepolymer, semi-prepolymer and one-shot foam techniques. In representative full prepolymer systems, the polyisocyanate is reacted with the polymeric polyol to prepare an isocyanato-terminated prepolymer which in a subsequent step is reacted with the cross-linker. In a representative semi-prepolymer technique; all or part of the isocyanate is reacted with all or part of the polymeric polyol and then in a subsequent step the remainder of the isocyanate and/or the polymeric polyol along with the crosslinker are reacted with the prepolymer formed in the first step. In a one-shot technique the isocyanate, polymeric polyol and crosslinker are all reacted substantially simultaneously. Such techniques are well known to those skilled in the art and can be varied routinely depending on the type of product desired.

The foams of this invention have high-quality physical properties and in particular are outstanding in that they have low 90% compression set. Because of the low compression set the foams may advantageously be used for the purpose of automotive and furniture cushioning.

The invention is further illustrated by the following examples wherein parts and percentages are by weight unless otherwise indicated.

EXAMPLES

Foam preparation

The foams for these examples were prepared by the one-shot technique by adding the following ingredients to a 250 ml. polypropylene beaker: the polymeric polyol, the blowing agent (if water, by syringe to insure accuracy), the cross-linking agent(s), the halogen source, the mineral acid and the urethane catalyst(s). This mixture was then agitated at 2600 r.p.m. for 20–30 sec. with a propeller type, high-speed agitator. The agitation was discontinued, the required amount of toluene diisocyanate added, and the mixture agitated as above for 5 sec. The mixture was poured into a ½ gallon icecream carton and the foam allowed to rise. After the foam had risen to its maximum height, it was cured in an oven at 100° C. for 1 hour. Test specimens were cut with an electric knife. The "90% compression set" was measured by the method ASTM–D 1564–71 Method B, Constant Deflection (90% compression for 22 hours at 70° C., then 30 min. relaxation at 25° C.). The compression set is expressed as percentage of the original compression.

The foams may also be prepared by the prepolymer and semi-prepolymer techniques as is readily apparent to anyone skilled in the art.

|  | Applicant's technique | | | | | | | Controls | | | |
|---|---|---|---|---|---|---|---|---|---|---|---|
|  | 1 | 2 | 3 | 4 | 5 | 6 | 7 | 8 | 9 | 10 | 11 |
| Polyetherpolyol [a] | 100 | 100 | 100 | 100 | 100 | 100 | 100 | 100 | 100 | 100 | 100 |
| Di- and polyamine [b] | 5 | 5 | 5 | 5 | 5 | | | 5 | 5 | 5 | |
| Glycerol | | | | | | 1.5 | 10 | | | | |
| $H_2O$ | 2 | 2 | 2 | 2 | 1.4 | 2 | 2 | 2 | 2 | 2 | 1.5 |
| Triethylenediamine [c] | 2 | 2 | 2 | 2 | 2 | 2 | 4 | 2 | 2 | 2 | 2 |
| Triethanolamine | 7 | 7 | 7 | 7 | 7 | 7 | | | | | 7 |
| Catalyst [d] | 0.1 | 0.1 | 0.1 | 0.1 | 0.1 | 0.1 | 0.1 | 0.1 | 0.1 | 0.1 | 0.1 |
| 85% $H_3PO_4$ | 0.5 | 0.5 | 0.5 | | | 0.1 | 0.1 | | | 0.5 | 0.1 |
| HCl (conc.) | | | | 1 | | | | | | | |
| $H_2SO_4$ (conc.) | | | | | 0.5 | | | | | | |
| Acetic acid (glacial) | | | | | | | | 0.5 | | | |
| $NH_4Cl$ | | | | 1 | | 0.5 | | | | | |
| $NH_4Br$ | | | | | | | 1 | | | | |
| Tribromophenol | | 3 | | | | | | | | | |
| 2,3-dibromopropanol | 2.72 | | | 2.72 | 2.72 | | | 2.72 | 2.72 | | |
| Diisocyanate [e] | 52.0 | 48.6 | 48.6 | 52.0 | 52.0 | 49.6 | 63.7 | 34.0 | 52.0 | 36.0 | 49.6 |
| 90% comp. set [f] | 14 | 14 | 11 | 13 | 10 | 10 | 9 | 96 | 81 | 95 | 86 |

[a] A polyoxypropylene triol, capped by ethylene oxide, with primary hydroxyl groups, made by the Dow Chemical Company ("Voranol C.P. 4701"). The molecular weight was 4,500 and the equivalent weight 1,500. It was presumably made from glycerol and propylene oxide and may be roughly represented by the following formula, where x is calculated to be about 25.

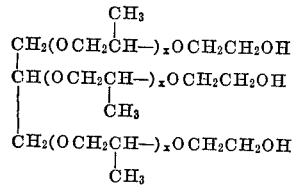

(Sp. gr. 1.017, $n_D^{25}$=1.450; pour point −21° F.; flash point 445° F. viscosity 765–780 centistokes at 77° F.; hydroxyl number 32–37.)
[b] A very viscous mixture of aromatic mono-, di- and polyamines, made from aniline and ortho-chloroaniline (mole ratio 1:3) plus formaldehyde (mole ratio 1.73:1). It has a functionality of 2.4, an equivalent weight of 128, chlorine content of 21.4% and an amino nitrogen content of 10.8%. Gas chromatographic analysis gave the following composition: 2% methylene dianiline; 20% methylene mono-orthochloro-diniline; 41% methylene bis-orthochloroaniline; 37% polyamines, mainly triamines.
[c] A solution of 33% triethylene diamine in diethlene glycol available as Dabco 33–LV from Houdry Co.
[d] Stannous octoate available as T-9, from M&T Chemicals, Inc.
[e] A crude (undistilled) tolylene diisocyanate, made during the production of a 2,4- and 2,6-diisocyanate mixture of isomer ratio 80/20. It is a dark liquid containing about 15% unidentified, high boiling isocyanate by-products. The functionality is expressed as 42.5% NCO. A mole ratio of 1.05 NCO: active hydrogen (—$NH_2$ and —OH) was used.
[f] ASTM–D 1564–71, Method B, constant deflection.

Examples 1 to 7 illustrate the improvements of the instant invention. The improvements obtained are not limited to di- and polyamine containing foam recipes (Examples 1 to 5), but also to other recipes, notably the polyol recipes exemplified by glycerol (Examples 6 and 7). Example 7 illustrates that instead of triethanolamine as the polyol another polyol, not necessarily as basic as triethanolamine, e.g., glycerol, can be used.

The control examples illustrate that a polyol, an acid source, and a halogen source are necessary, or the results are inferior (Example 8). Similarly, the mineral acid cannot be replaced with an equivalent amount of an organic acid (Example 9). A polyol such as glycerol or triethanolamine must also be present (Example 10). Comparison of Examples 6 and 11 illustrates that a halogen source must be present.

What is claimed is:

1. A process for producing a flexible polyurethane foam having low 90% compression set which comprises reacting an undistilled phosgenation product of tolylene diamine, which has an amine equivalent of about 90–125, a polymeric polyol and a cross-linking agent, in the presence of a blowing agent, a halogen source selected from the group consisting of ammonium chloride, ammonium bromide, tetramethyl ammonium chloride, tribromophenol, 2-bromopropane, 2-bromopropanol, 1,2-dibromopropane, 2,3-dibromopropene, 2,3-dibromopropanol, 2-chloropropane, 2-chloropropanol, 1,2-dichloropropane, 2,3-dichloropropene, 2,3-dichloropropanol and mixtures thereof, a mineral acid, a tin-based urethane catalyst and a tertiary amine catalyst.

2. The process of claim 1 wherein said mineral acid is selected from the group consisting of sulfuric acid, hydrochloric acid, nitric acid and phosphoric acid.

3. The process of claim 1 wherein said halogen source is selected from the group consisting of 2,3-dibromopropanol, ammonium chloride and ammonium bromide.

4. The process of claim 1 wherein said mineral acid is $H_3PO_4$.

5. The process of claim 1 wherein said polymeric polyol has a hydroxyl number of about 20–45.

6. The process of claim 1 wherein said cross-linking agent is a polyol having an equivalent weight of about 30–80.

7. The process of claim 6 wherein an additional cross-linking agent, polyamine, is present.

8. The process of claim 7 wherein said tertiary amine catalyst is triethylene diamine.

9. The process of claim 8 wherein the said tin-based urethane catalyst is stannous octoate.

10. The process of claim 9 wherein said blowing agent is water.

11. The process of claim 1 wherein said polymeric polyol is a polyether polyol.

12. The product of claim 1.

13. The product of claim 7.

14. The product of claim 10.

References Cited
UNITED STATES PATENTS

| | | | |
|---|---|---|---|
| 3,644,235 | 2/1972 | Gray | 260—2.5 A T |
| 3,471,417 | 10/1969 | Dickert | 260—2.5 A T |
| 3,563,906 | 2/1971 | Hoeschele | 260—75 N H |
| 3,458,558 | 7/1969 | Cheng | 260—2.5 A T |
| 3,264,336 | 8/1966 | Powers | 260—2.5 A T |

DONALD E. CZAJA, Primary Examiner

M. J. WELSH, Assistant Examiner

U.S. Cl. X.R.
260—2.5 BB, 2.5 AJ